Sept. 19, 1961     M. W. CRABB     3,000,112

AUTOPILOT SIMULATOR

Filed April 21, 1959

MERLE W. CRABB
INVENTOR

BY *Delbert P. Warner*

ATTORNEY

3,000,112
AUTOPILOT SIMULATOR
Merle W. Crabb, Endicott, N.Y., assignor to General Precision, Inc., a corporation of Delaware
Filed Apr. 21, 1959, Ser. No. 807,920
3 Claims. (Cl. 35—12)

The present invention relates to the simulation of certain characteristics of autopilots. In particular, it is directed toward the generation of signals representing the corrective signals provided by autopilots to restore an airplane to its desired course and attitude upon the occurrence of minor deviations in said course and/or in said attitude.

Modern flight simulators have reached a stage of development at which each characteristic of an aircraft can be, and indeed must be, accurately simulated. This need for accurate simulation transcends the simulation of actual characteristics of aircraft and requires that all the auxiliary equipment normally found in such aircraft be simulated also. This increased need must be met in order to assure that the environment surrounding a student pilot will be as near that which would surround him in an aircraft as possible. Among these auxiliary devices are automatic pilots, the simulation of which in aircraft flight simulators is a widespread practice.

In many flight simulators, the simulation of the automatic pilot consists in simulating each function of the automatic pilot by directly analogous means. This approach necessitates the use of a great deal of electromechanical equipment which is then not available to provide any other function in the simulator. An example of such a system is one normally used to provide the heading error signal $\psi_E$ which involves the use of a simulated compass coupler comprising a synchronizer, a synchro or 400 c.p.s. autosyn and means demodulating the resultant signal to represent the error. Such elaborate equipment is necessary in some cases such as in the generation of signals representing the bank angle error, which varies over very wide ranges. Such elaborate systems are wasteful of space and material when applied to simulate many functions, however.

It is a primary object of the present invention, therefore, to provide improved means for simulating certain characteristics of an auto-pilot as applied to an aircraft trainer.

It is a further object of this invention to provide improved means for simulating the generation of deflection signals by an autopilot.

It is another object of this invention to provide means for generating realistic deflection signals denoting the required changes in the heading provided by a simulated autopilot in order to restore an aircraft simulator to the desired simulated heading.

It is yet another object of this invention to provide improved means of simulating the "memory" of a reference direction signal which may then be added algebraically to a signal representing the actual direction in order to provide an error signal of use in controlling means for changing the simulated actual direction to conform to the reference direction.

The foregoing objects and others ancillary thereto I prefer to accomplish as follows:

According to a preferred embodiment of my invention, I provide apparatus in the form of a normal integrating amplifier, across the feedback capacitor of which a small resistor may be coupled under initial conditions of operation. My invention involves taking a rate signal representing the rate of change of heading, or the rate signal of any other quantity to be computed, and applying it to the input terminal of the above mentioned integrating circuit, with the resistor connected across the condenser, until such time as the desired heading, or other signal, is determined. The reference signal in said integrating amplifier as determined at this time is essentially a zero signal, since the output of the integrating amplifier will remain zero for so long as the resistor shunts the feedback capacitor. The resistor may then be disconnected from the circuit and the integrating amplifier can then function as an integrator, and any further changes in the rate signal will be integrated to provide an output voltage proportional to the difference between said reference signal and said newly integrated signal. This error signal may then be applied into the flight system as an aileron deflection. Thus it may be seen that any change in the heading signal, after the integrator is connected, will produce an error signal $\psi_E$ which may be fed back into the aircraft simulator to prevent the change or to return the heading angle to the reference value. It will be appreciated that this action will occur, since the integrator operates as a memory unit in that it has zero output when the desired heading and the actual heading are the same, and also provides the difference between the old heading, or the reference heading, and the new heading at all times.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1:
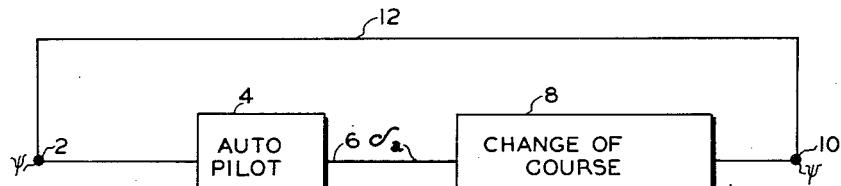
FIG. 1 is a block diagram representing functions of an aircraft autopilot which are of importance in this invention.

The block diagram in FIG. 1 has been included to provide a ready means for showing the functions of an autopilot, which it is a principal object of this invention to simulate. As shown in FIG. 1 a potential proportional to aircraft heading $\psi$ is provided at a terminal 2 which is connected to an input terminal of a block 4 which represents an autopilot. The output of the autopilot on line 6 represents the aileron deflection $\delta_a$ which is applied to a block 8 representing means for changing the course. The output of the change of course mechanism 8 may be a signal which is amplified by servo mechanism to provide sufficient force to operate the control surfaces of an aircraft. For the sake of simplicity this output has been indicated as merely a signal potential $\psi$ at terminal 10 which may be applied to the input terminal 2 through a circuit indicated by the line 12.

The feedback loop described in connection with FIG. 1 represents a simplified but fairly conventional and straightforward presentation of this subject, thus far. One of the more significant considerations in this circuit has not yet been touched upon however and that is the question of comparing the aircraft heading $\psi$, as it may actually exist at a moment of flight, with the desired aircraft heading which may be labelled $\psi_0$. This comparison is made in the autopilot 4 and involves simply comparing the input $\psi$ from terminal 2 with an internal memory of the desired heading $\psi_0$ to provide a difference signal which may then be translated over line 6 as a deflection signal $\delta_a$. It will be recognized that the same principles apply, whether the signals it is desired to control are signals of heading, roll, pitch, or any other quantity it is desired to simulate with respect to aircraft.

Figure 2:
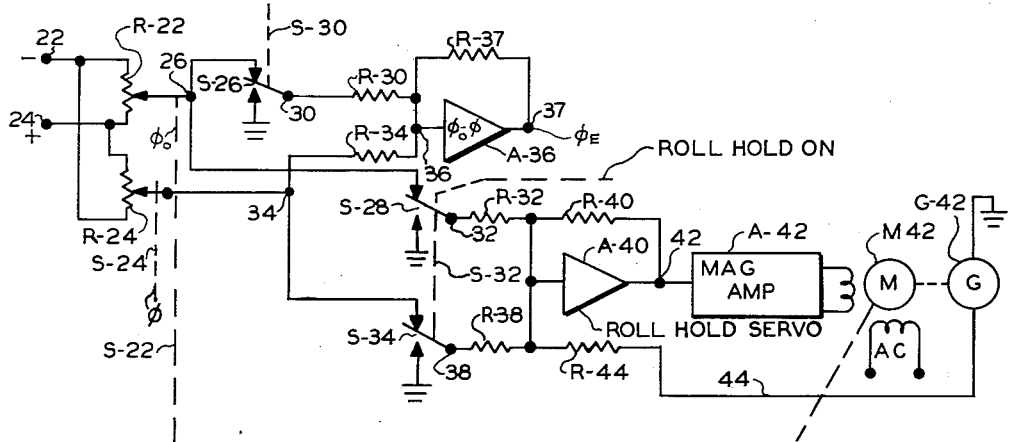
FIG. 2 is a schematic diagram illustrating one manner in which functions of an autopilot may be simulated.

Turning now to FIG. 2, we find a diagram of apparatus which makes use of the principles defined in connection with FIG. 1 to provide an error signal which may be used subsequently in the control of the aircraft simulator. The error signal generated in FIG. 2 is a bank angle error $\phi_E$, which employs circuitry including relays, a roll hold switch, a magnetic amplifier, a motor generator circuit and a potentiometer to provide a "memory" of the desired reference signal.

Negative and positive potentials are applied at terminals 22 and 24, respectively, of FIG. 2 to energize potentiometers R-22 and R-24 with the polarity shown in FIG. 2. The position of the wiper arm of potentiometer R-22 is controlled by a shaft S-22 to provide a potential proportional to the reference bank angle $\phi_0$, as described hereinafter, at terminal 26. The potential appearing on terminal 26 will be applied through the upper contacts of switches S-26 and S-28 from which they may be transferred to terminals 30 and 32, or not, depending upon the positions of the respective switch blades in the switches. It will be recognized that the functions "Heading Hold On" and "Roll Hold On" associated with shafts S-30 and S-32, when applied, will cause the switch blades on switches S-26 and S-28 to close on the ground sides. It will be recognized that the convention of showing switch blades closed on contacts providing functions other than those called out in drawings is one which is commonly applied to analog computers.

The position of the wiper arm of potentiometer R-24 is determined by the shaft S-24 in response to a shaft position corresponding to the bank angle $\phi$. The bank angle $\phi$ is a conventional magnitude, which will be available in nearly all modern aircraft simulators, and for that reason it has not been felt necessary to derive this quantity in connection with the instant application. It should be recognized that the quantity $\phi$, in the simulator, corresponds to the actual bank angle of an aircraft, and consequently it is this quantity which would be compared to the reference bank angle in an autopilot in the event that the autopilot was set to provide for the operation of the aircraft with a constant bank angle.

Bank angle $\phi$, from potentiometer R-24, will be supplied to a terminal 34 and from there through a resistor R-34 to a terminal 36, and also to the upper contact of switch S-34, the switch blade of which is controlled by a shaft S-32 in accordance with the function of "Roll Hold On." When "Roll Hold On" control is actually applied to the shaft S-32, the switch blade of switch S-34 will contact the ground terminal exactly as will the switch blade of the switch S-28, the performance of which was described above. While the switch blade S-34 contacts the upper contact a connection will be maintained between terminal 34 and terminal 38.

Assuming that the "Roll Hold On" control mechanism is not operated, so that the switch blades of switches S-28 and S-34 remain in contact with the upper contact points of said switches, the potentials $\phi_0$ on terminal 32 and the potential $\phi$ on terminal 38 will be summed through the action of resistors R-32 and R-38, the roll hold servo amplifier A-40 and the feedback resistor R-40 to provide an output at terminal 42 proportional to the sum of $\phi_0$ and $\phi$. A potential appearing at terminal 42 is fed to the magnetic amplifier A-42 which will position the motor M-42 and generator G-42 in accordance with the magnitude at terminal 42. A conventional rate feedback is shown from the generator G-42 through line 44 and resistor R-44 to the input of amplifier A-40.

It is apparent from the polarities applied to the potentiometers R-22 and R-24 that the sum of the outputs of the wiper arms of those two potentiometers produces a signal at 42. This in turn controls the magnetic amplifier, the motor, and the position of the shaft S-22 to position the wiper arm on potentiometer R-22, so that the output potential appearing at terminal 42 will tend toward zero. This means that $\phi_0$ must be of equal amplitude and opposite polarity to $\phi$ for so long as the circuit remains connected in this fashion or that the system will tend to balance so that $\phi_0 = \phi$.

While the contacts remain closed in the fashion shown in FIG. 2, it follows from the above that the potentials supplied from terminals 30 and 34 through resistors R-30 and R-34, respectively, to terminal 36 will sum in amplifier A-36 to provide an output at terminal 37 and through resistor R-37 which is equal to zero. It will be recognized under these circumstances of operation, that no error signal will be produced and that the simulated autopilot is kept fixed insofar as roll and bank angle of the aircraft are concerned. While the apparatus of FIG. 2 remains in this configuration, it is apparent that the position of the wiper arm on potentiometer R-22 represents a sort of "memory" of the magnitude of the bank angle of each moment, which may be stored by operation of the "Roll Hold On" function which opens the upper contacts of switches S-28 and S-34 and closes the lower grounded contacts. When this is done, the motor M-42 will be stopped, since no further error signals will be fed to it, and the position of the wiper arm on potentiometer R-22 will be frozen. A potential proportional to $\phi_0$, or the desired reference bank angle, will then be supplied to the terminal 30 and through resistor R-30 to terminal 36 of amplifier A-36. Thereafter, any changes in the bank angle $\phi$ will produce a change in the potential appearing on the wiper arm of potentiometer R-24 which will be transmitted through terminal 34 and potentiometer R-34 to terminal 36, to be summed in amplifier A-36 to provide an error signal $\phi_E$ at terminal 37. The error $\phi_E$ appearing on terminal 37 may then be fed back through elements of the aircraft simulator representing the control surfaces of an aircraft, to provide a simulated change in the bank angle which would be reflected by change in the position of the shaft S-24.

It will be seen thus that the circuit in FIG. 2 accurately simulates that portion of an autopilot which would control the bank angle of an airplane in a situation where the bank angle was desired to be maintained constant. The servo amplifier and servo mechanisms illustrated in FIG. 2 have been shown to simulate the "memory" of an autopilot in that they make it possible to "fly" the simulator along a desired bank angle course for a moment and then turn on the autopilot function by operating the "Roll Hold On" control means, just as may be done with an autopilot in an actual aircraft.

Figure 3:
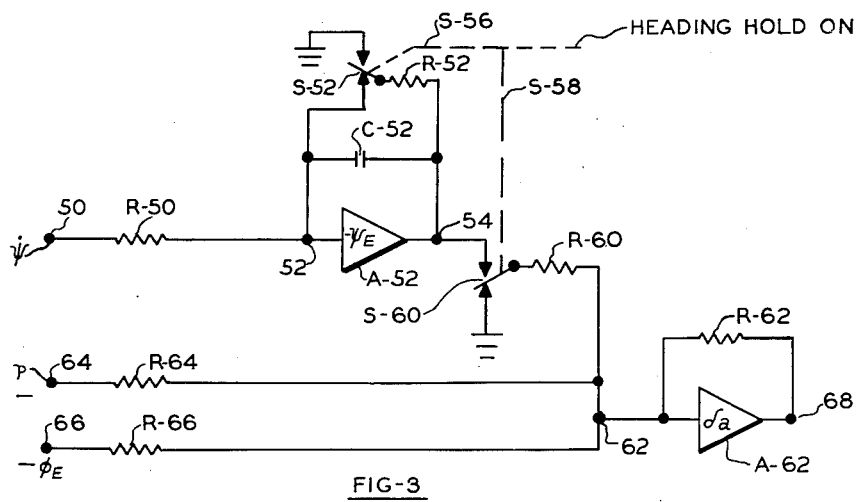
FIG. 3 is a block diagram illustrating the application of the principles of this invention to a preferred embodiment thereof.

A schematic drawing of an embodiment of the invention is shown in FIG. 3 which simulates the effect of an autopilot in a simpler fashion than does the device in FIG. 2. The apparatus in FIG. 3 is limited to some degree in that it may not be used in cases where the quantity being simulated fluctuates by a large amount. It might not prove satisfactory, for example, in place of the apparatus of FIG. 2 for the simulation of bank angle and bank angle error, since the range over which the error must be calculated by electronic integration might be too great. This limitation on the circuitry of FIG. 3 is of no significance in those cases in which the deviation is not very great, such as in the heading error and advantages of simplicity of operation and construction over the circuit of FIG. 2 are very great. The circuit of FIG. 3 might be of use in the simulation of such factors as bank angle error in case less rigorous simulation is acceptable.

The embodiment of the invention shown in the circuit of FIG. 3 makes use of the fact that a quantity proportional to $\dot{\psi}$ is generally available in modern aircraft simulators. This quantity is used in determining instantaneous heading by integration. The signal $\dot{\psi}$ is applied to appropriate heading integrating and indicating devices (not shown) and simultaneously is applied at terminal 50 of the instant invention and through a resistor R-50 to the input terminal 52 of an operational amplifier A-52. The output terminal 54 of said operational amplifier is connected back to the input terminal 52 through a condenser C-52 which is connected in parallel with resistor R-52 through a switch S-52 when the "Heading Hold On" mechanism is not operated.

Resistance R-52, in the feedback circuit of the operational amplifier A-52, is made very much smaller than the resistor R-50 so that the ratio of resistance of R-52/R-50 will be of the order of $\frac{1}{2000}$ and the output at terminal 54, for so long as the switch blade of switch S-52 is closed to connect the resistor R-52 in parallel with the condenser C-52, will be zero or very nearly so. The mechanism providing the "Heading Hold On" is connected by shafts S-56 and S-58 to switches S-52 and S-60 as shown. Resistor R-60 is shown making contact to the ground and also to terminal 62. The inputs on terminals 64 and 66 which are given as being equal to roll rate and bank angle error are applied through resistors R-64 and R-66 to terminal 62. Amplifier A-62 with the help of feedback resistor R-62 provides an output at terminal 68 proportional to the aileron deflection required to correct the heading angle.

The inputs at terminals 64 and 66 are provided to indicate to some degree the range of correcting inputs which become necessary to actual computation of a function such as an aileron deflection. This essentially is a problem of determining heading error, which of course in a three dimensional medium may require the consideration of other factors which when varied also serve to vary the heading. The magnitude appearing at terminal 64 is roll rate which may be derived from other portions of an aircraft simulator. The quantity $\phi_E$ at terminal 66 is the roll angle error, which may be derived from a circuit such as that of FIG. 2. It will be noted that this value is actually equal to $\phi$ when the "Heading Hold On" element opens the upper contact of the switch S-30. It will be appreciated that neither of these errors is of importance to the understanding of the instant invention and they have been inserted primarily in the interest of completeness.

An expression of the relationship computed by the circuit of FIG. 3 may be expressed by a simplified equation of the following form:

$$\delta_a = K_1(\phi_E + K_2\dot{\phi} - K_3\psi_E)$$

where:

$\delta_a$ = aileron deflection,
$\phi_E$ = actual measured airplane roll angle error at any instant,
$\dot{\phi} = p$ = roll rate of the airplane,
$\psi_E$ = heading error signal, i.e., the difference between the actual heading at any time and the heading at the instant the heading control system was engaged, and
$K_1$, $K_2$ and $K_3$ are control gains.

Turning now to consideration of the operation of the circuit in FIG. 3, we find that so long as the rate of change of heading $\dot{\psi}$ is applied at terminal 50, and the contact blade of switch S-52 remains closed on the lower contact of said switch S-52, that the output at 54 will be essentially zero. It must be noted that this zero ends at the time when the switch blade of switch S-52 is closed to ground at its upper contact after which the integrator C-52 will charge and discharge in response to the signal appearing at terminal 50. It is apparent therefore that the potential appearing at terminal 54 and through resistor R-60 to input terminal 62, is the integral of $\dot{\psi}$ only during the period following the closing of switch S-52 to ground and consequently the potential appearing at terminal 54 is a potential $\psi_E$ which is proportional to the deviation of heading from the magnitude it possessed at the moment of closure of switch S-52 to ground. In other words, the integrating circuit including amplifier A-52 and condenser C-52 has been rigged to possess a "memory" such that the signal it integrates is the error signal only, which may be applied at terminal 62 to be summed with the other errors in amplifier A-62 to provide an appropriate simulated deflection for the simulated ailerons of the aircraft simulator. This simulated deflection will be fed back through the feedback circuits of the simulator to provide a change in the heading $\psi$ which in turn will effect the rate of change of heading $\dot{\psi}$ at terminal 50 in a direction to correct the error signal appearing at terminal 54.

It should be noted that the circuit of FIG. 3, after the substitution of appropriate inputs, may be used to simulate other control systems in an autopilot. For example, it may be used to simulate the altitude control system of the autopilot. In that case a control equation similar to that expressed herein previously, but written to express relationships about the pitch axis, would be utilized and the altitude error would be produced in a similar manner to the above by integrating a $\dot{h}$ signal at the instant of engagement.

Reset of the integrator circuit to zero may be accomplished by a novel method wherein R-52 is used to discharge the capacitor C-52 through the lower contact of switch S-52 and the switch blade of switch S-52 by the release of "Heading Hold On." R-52 is made very much smaller than R-50 so that in the reset position the voltage output of the amplifier will be $$\dot{\psi}\frac{R_{52}}{R_{50}}$$

where $R_{52}$ and $R_{50}$ are taken to be the resistance respectively of resistors R-52 and R-50. It will be seen that if the ratio of $$\frac{R_{52}}{R_{50}}$$

is of the order of $\frac{1}{2000}$, or less, that the output of amplifier A-52 will be negligible.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. In an autopilot simulator, means for generating a deflection signal proportional to that required to restore an aircraft to a true course comprising integrating means, means for supplying a rate signal, said integrating means integrating said rate signal from a given reference time to provide an error signal, means associated with said integrating means for providing initial conditions including a resistor and first switch means connectable to force the output of said integrating means to a substantially zero value, second switch means for disconnecting the output of said integrating means from succeeding components in said simulator, said first switch means disconnecting said resistor to allow said integrating means to integrate said rate signal commencing at any selected time to force the output of said integrating means to represent said error signal, said second switch means connecting the output of said integrating means to succeeding components in said simulator at said selected time, means providing additional signals representing factors affecting said deflection signal, and means for summing said error signal and said additional signals to generate said deflection signal.

2. In an autopilot simulator, means for generating a deflection signal proportional to that required to restore an aircraft to a true course comprising integrating means, means connected to said integrating means for supplying a rate signal, said integrating means integrating said rate signal from a selected reference time to provide an error signal, means associated with said integrating means for establishing said reference time including a resistor and first switch means connectable to force the output of said integrating means to a substantially zero value, second switch means for disconnecting the output of said integrating means from succeeding components in said simulator, said first switch means disconnecting said resistor to allow said integrating means to integrate said rate signal commencing at said reference time to force the output of said integrating means to represent said error signal, said second switch means connecting the output of said integrating means to succeeding components in said simulator at said selected time, means providing additional signals representing factors affecting said deflection signal, and means including a summing amplifier for summing said error signal and said additional signals to generate said deflection signal.

3. In an autopilot simulator, means for generating a deflection signal proportional to that required to restore an aircraft to a true course comprising integrating means, said integrating means comprising an operational amplifier coupled to a feedback condenser, means connected to said integrating means for supplying a rate signal, said integrating means integrating said rate signal from a given reference time to provide an error signal, means associated with said integrating means for establishing said reference time including a resistor and first switch means connectable in parallel with said feedback condenser to force the output of said integrating means to a substantially zero value, second switch means for disconnecting the output of said integrating means from succeeding components in said simulator, said first switch means disconnecting said resistor to allow said integrating means to integrate said rate signal commencing at said selected time to force the output of said integrating means to represent said error signal, means connecting said first switch means to said second switch means for connecting the output of said integrating means to succeeding components in said simulator at said selected time, means providing additional signals representing factors affecting said deflection signal, and means including a summing amplifier for summing said error signal and said additional signals to generate said deflection signal.

References Cited in the file of this patent

UNITED STATES PATENTS 2,620,463   Meredith _____ Dec. 2, 1952

OTHER REFERENCES

"Electronic Analog Computers" (text), second edition, 1956, Korn and Korn, McGraw-Hill Book Co., page 134, Fig. 3.20b, and page 385, Fig. 7.30.